T. CULLI.
COMBINED CORN CUTTER AND SHOCK MOVER.
APPLICATION FILED APR. 15, 1912. RENEWED APR. 6, 1914.
1,111,951.
Patented Sept. 29, 1914.
2 SHEETS—SHEET 1.
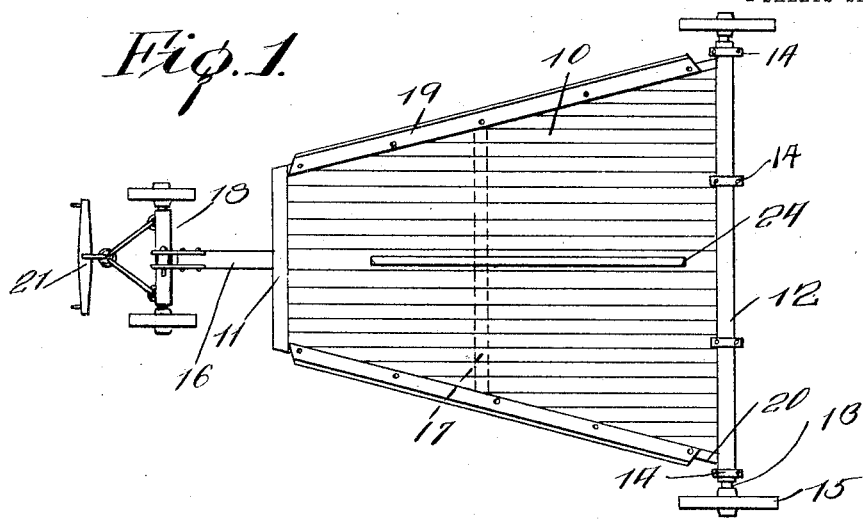
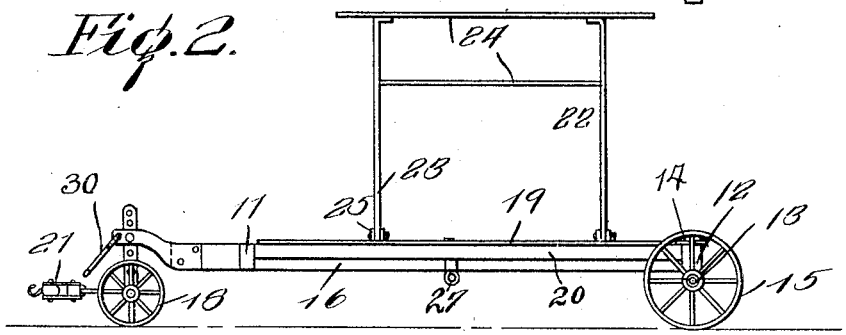
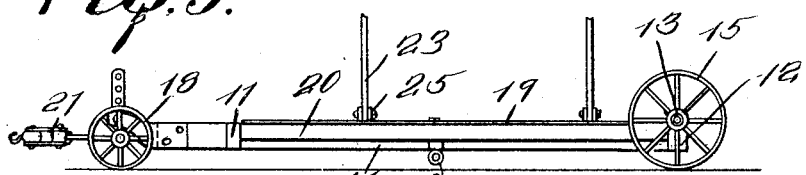
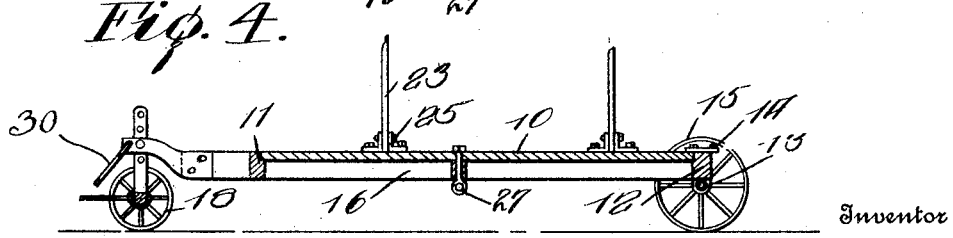

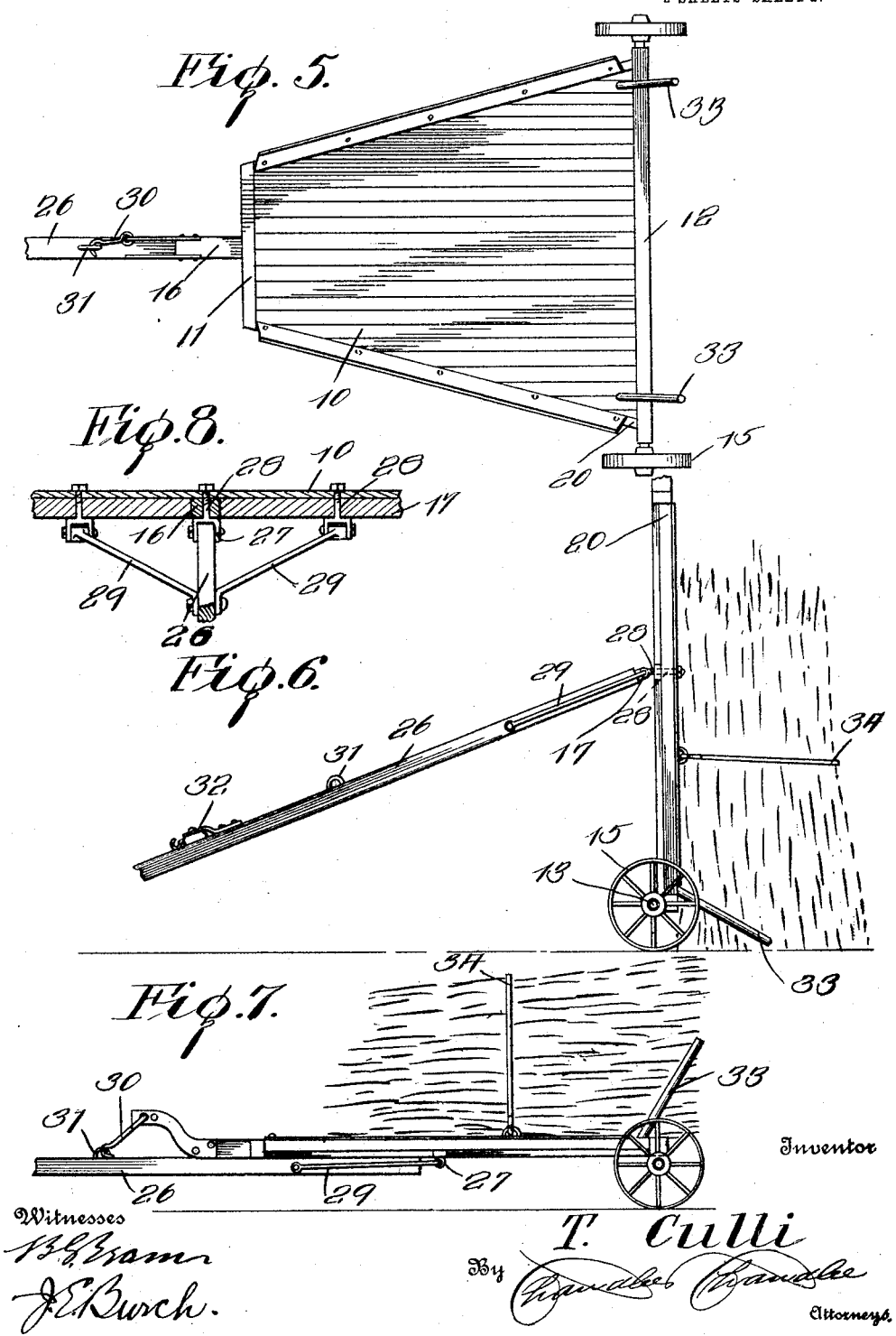

UNITED STATES PATENT OFFICE.

THEODORE CULLI, OF MASCOUTAH, ILLINOIS.

COMBINED CORN CUTTER AND SHOCK MOVER.

1,111,951.   Specification of Letters Patent.   Patented Sept. 29, 1914.

Application filed April 15, 1912, Serial No. 690,822. Renewed April 6, 1914. Serial No. 830,083.

*To all whom it may concern:*

Be it known that I, THEODORE CULLI, a citizen of the United States, residing at Mascoutah, in the county of St. Clair, State of Illinois, have invented certain new and useful Improvements in Combined Corn Cutters and Shock Movers; and I do hereby declare the following to be a full, clear, and exact description of the invention, such as will enable others skilled in the art to which it appertains to make and use the same.

This invention relates to new and useful improvements in harvesting implements and more especially to a combined corn cutter and shock mover, the primary object of the invention being to provide a simple and improved form of device of this character for effectively cutting the corn stalks and loading or unloading the shocks without the usual necessity of handling the same which owing to the cubersome character of the shocks has rendered such moving very inconvenient.

Another object of this invention is to provide a combined corn cutter and shock mover which comprises a novel arrangement of parts comprising a vertically adjustable platform carrying blades, so as to produce high or low stubbles and also so that the device can be readily changed or transformed from a stalk cutter to a shock mover.

With the above and other objects in view, the invention consists of certain other combinations and arrangements of parts as will be hereinafter more fully described, claimed and illustrated in the accompanying drawings, in which:—

Figure 1 is a top plan view of my improved device as adapted for use as a corn cutter. Fig. 2 is a side elevation thereof. Fig. 3 is a view similar to Fig. 2 but showing the platform in a position for cutting stalks from a different height from that shown in Fig. 2 of the drawings. Fig. 4 is a longitudinal sectional view of the device. Fig. 5 is a plan view of the device in use as a shock mover. Fig. 6 is a side elevation thereof as in engaging a shock. Fig. 7 is a side elevation of the device with the shock engaged thereon. Fig. 8 is a detail view of the tongue attaching means.

Referring more specifically to the drawings, wherein like reference characters designate similar parts throughout the several views, the numeral 10 designates the platform of my improved corn cutter and shock mover, the same being of trapezoidal form in plan view and having a relatively short front beam 11 secured thereto while a member or beam 12 is secured transversely of the longer or rear end of the platform and has a tubular axle 13 detachably clipped thereto as shown at 14 whereby said axle may be secured to the top or bottom face of the said beam 12 and thus regulate the height of the platform from the ground. Ground wheels 15 are journaled on the ends of the axle 13 while a center beam 16 connects the forward and rear beams 11 and 12 and an intermediate transverse brace member 17, the said central beam 16 extending forwardly of the beam 11 for the attachment of a wheeled truck 18, the said truck being vertically adjustable relative to the forward end of the center beam 16 so as to coact with the adjustment of the rear axle to make high or low stubbles, according to the adjustment of the platform relative to the ground.

Diagonal side portions of the platform 10 have knife members 19 secured thereto through the medium of attachment beams 20 whereby when the machine is drawn forwardly by a single draft animal connected to the swingle-tree 21 connected to the wheeled truck 18, said draft animal will travel between two rows of stalks which will be cut at one and the same time. During this operation, the stalks or fodder are drawn on to the platform by an operator disposed on either side of the central beam 16 as said stalks or fodder are cut and in order to support the same for forming the shock, an upright frame 22 comprising vertical side members 23 and cross connecting members 24, is removably clamped to the platform as shown at 25 longitudinally of the platform centrally of its width, thereby permitting the fodder to lean against said upright until the shock has been completed.

When the device is in use as a shock mover, the upright 22 is removed and also the wheeled truck at the forward end of the beam 16 and in lieu thereof, a draft tongue 26 is pivotally connected to the central beam 16 and the transverse brace member 17 by means of U-clips 27 having shank portions 28 bolted through said center beam and transverse brace and having the extremity of the tongue secured between the leg portions of the clamp or central clip 27 and brace members 29 are connected to said clamps upon opposite sides thereof and to the transverse brace member. The forward extremity of the central beam is also provided with a pivoted hook member 30 which is adapted to engage an eye 31 carried by the tongue for holding the platform in a horizontal or lowered position when conveying the shock. Draft attaching means 32 are also carried by the tongue 26 and a pair of stakes 33 are secured adjacent opposite sides of the platform at the rear end thereof so as to protect the fodder from contacting with the ground wheels 15. When it is desired to load a shock upon the platform, the hook 30 is disengaged from the eye 31 and the device is backed into position adjacent the shock, while the forward end of the platform is raised by the operator thus causing the platform to be tilted or moved to an upright position as illustrated in Fig. 6 of the drawings, in which position a safety tackle or hoist 34 is engaged around the shock and attached to the platform at opposite sides thereof whereby when the device is pulled forwardly, the platform with its surmounted shock will fall to a lowered position upon the tongue and the hook 30 is engaged with the eye 31 to hold the same in such position. The shock may then be advanced or transported to the desired place where it is to be sheltered and by disengaging the hook from the eye in the manner aforementioned and by backing the vehicle and raising the forward end of the platform, it will again move to an upright position whereupon loosening of the tackle will release the shock to set the same up in a perfect shape without the necessity of handling the fodder during the loading and unloading action.

From the foregoing description, in connection with the accompanying drawings, it will be apparent that I have provided a very desirable and improved form of device for cutting corn and conveying or moving the shock, it requiring only two men in order to operate the device, one upon each side of the platform and upright whereby the forward movement of the machine will cut two rows of stalk at the same time, this being greatly facilitated by reason of the diagonal arrangement of the knives and the stalks can be conveniently handled or disposed against the upright until the shock of the required size is collected. The quick and easy manner in which the device is adjustable or adapted to be converted from a corn cutter to a shock mover or vice versa, also renders the device extremely desirable owing to the fact that one machine with a few additional parts will suffice for the purpose of two machines as heretofore constructed.

I claim:

1. In a corn harvester, an axle; a platform partially supported by the axle, a beam at the rear end of the platform, said axle being removably clipped to the beam for disposal upon the bottom or top face thereof to regulate the height of the platform from the ground, a wheeled truck at the forward end of the platform and adjustable vertically with respect to the platform, knives carried by the platform, and draft means connected to the platform.

2. A corn harvester and carrier comprising a platform having means thereon for cutting corn stalks, said platform being adapted to receive the corn stalks after they are cut, an axle at the rear end of the platform, wheels on the axle, means whereby the axle may be clamped to the top and bottom surfaces of the platform alternately for adjusting the elevation of said rear end, means whereby the elevation of the front end of the platform may be adjusted, and draft means connected to the platform.

3. A combined corn cutter and shock mover comprising a platform having cutting blades thereon and having a central beam projecting in advance of the forward end thereof, a transverse brace medially of the platform, an axle at the rear end of the platform, wheels on the axle, a truck detachably connected to the forward end of the beam, means on the transverse brace for detachably connecting a suitable tongue when the truck is detached, and means carried by the forward end of the beam for detachably connecting the latter to said tongue.

In testimony whereof, I affix my signature in presence of two witnesses.

THEODORE CULLI.

Witnesses:
RUDOLPH J. CULLI,
PETER W. LILL.

---

Copies of this patent may be obtained for five cents each, by addressing the "Commissioner of Patents, Washington, D. C."